(12) United States Patent
Tabuchi et al.

(10) Patent No.: US 10,817,451 B1
(45) Date of Patent: Oct. 27, 2020

(54) METHODS AND SYSTEM FOR AN INTEGRATED CIRCUIT

(71) Applicant: SEMICONDUCTOR COMPONENTS INDUSTRIES, LLC, Phoenix, AZ (US)

(72) Inventors: Yoshihisa Tabuchi, Gifu (JP); Tomonori Kamiya, Ichinomiya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/449,663

(22) Filed: Jun. 24, 2019

(51) Int. Cl.
G06F 13/40 (2006.01)
G06F 13/42 (2006.01)

(52) U.S. Cl.
CPC ........ *G06F 13/404* (2013.01); *G06F 13/4022* (2013.01); *G06F 13/4282* (2013.01); *G06F 13/4291* (2013.01); *G06F 2213/0016* (2013.01); *G06F 2213/0052* (2013.01)

(58) Field of Classification Search
CPC .......... G06F 13/404; G06F 2213/0052; G06F 13/4022; G06F 13/4282; G06F 13/4291; G06F 2213/0016
See application file for complete search history.

(56) References Cited

U.S. PATENT DOCUMENTS

| | | | |
|---|---|---|---|
| 2012/0191889 A1* | 7/2012 | Fischer | G06F 13/4291 710/110 |
| 2014/0025851 A1* | 1/2014 | Decesaris | G06F 13/385 710/110 |
| 2015/0347344 A1 | 12/2015 | Fosse | |
| 2017/0177531 A1* | 6/2017 | Freudenberger | G06F 13/4291 |
| 2018/0348835 A1* | 12/2018 | Toriumi | G06F 1/3209 |
| 2019/0108149 A1* | 4/2019 | Graif | G06F 13/364 |

* cited by examiner

*Primary Examiner* — Eric T Oberly
(74) *Attorney, Agent, or Firm* — The Noblitt Group, PLLC; Hettie L. Haines (57) ABSTRACT

Various embodiments of the present technology may provide methods and system for an integrated circuit. The system may provide, at most, two integrated circuits (i.e., slave devices) connected to and configured to communicate with a host device (i.e., a master device). At least one of integrated circuits may comprise a first interface and a second interface, wherein the second interface is connected to the host in a manner that is opposite that of the first interface.

19 Claims, 7 Drawing Sheets

| ACTION | DEVICE 1 | | DEVICE 2 | | | |
|---|---|---|---|---|---|---|
| | MAIN I/F (125) | | MAIN I/F (200) | | CONTROL CIRCUIT | |
| | ADDRESS | PIN CONNECTION | ADDRESS | PIN CONNECTION | ADDRESS | PIN CONNECTION |
| IMPLEMENTATION | XX | FORWARD | XX | REVERSE | SS | FORWARD |
| CHANGE ADDRESS 1<br>SLAVE ADDRESS: XX<br>SET TO CHANGE THE SLAVE ADDRESS FROM XX TO YY | XX→YY | FORWARD | XX | REVERSE | SS | FORWARD |
| BUS SWITCHING<br>SLAVE ADDRESS: SS<br>SEND START CONDITION AND SLAVE ADDRESS AT LEAST | YY | FORWARD | XX | REVERSE→<br>FORWARD | SS | FORWARD→<br>REVERSE |
| CHANGE ADDRESS 2<br>SLAVE ADDRESS: XX<br>SET TO CHANGE THE SLAVE ADDRESS FROM XX TO ZZ | YY | FORWARD | XX→ZZ | FORWARD | SS | REVERSE |
| RESULT | YY | FORWARD | ZZ | FORWARD | SS | REVERSE |

FIG.6

| ACTION | DEVICE 1 | | | | DEVICE 2 | | | |
|---|---|---|---|---|---|---|---|---|
| | MAIN I/F (125) | | CONTROL CIRCUIT 1 | | MAIN I/F (200) | | CONTROL CIRCUIT 2 | |
| | ADDRESS | PIN CONNECTION | ADDRESS | PIN CONNECTION | ADDRESS | PIN CONNECTION | ADDRESS | PIN CONNECTION |
| IMPLEMENTATION | XX | FORWARD | SS | REVERSE | XX | REVERSE | SS | FORWARD |
| CHANGE ADDRESS 1 SLAVE ADDRESS: XX SET TO CHANGE THE SLAVE ADDRESS FROM XX TO YY | XX->YY | FORWARD | SS | REVERSE | XX | REVERSE | SS | FORWARD |
| BUS SWITCHING SLAVE ADDRESS: SS SEND START CONDITION AND SLAVE ADDRESS AT LEAST | YY | FORWARD | SS | REVERSE | XX | REVERSE->FORWARD | SS | FORWARD->REVERSE |
| CHANGE ADDRESS 2 SLAVE ADDRESS: XX SET TO CHANGE THE SLAVE ADDRESS FROM XX TO ZZ | YY | FORWARD | SS | REVERSE | XX->ZZ | FORWARD | SS | REVERSE |
| RESULT | YY | FORWARD | SS | REVERSE | ZZ | FORWARD | SS | REVERSE |

FIG. 7

METHODS AND SYSTEM FOR AN INTEGRATED CIRCUIT

BACKGROUND OF THE TECHNOLOGY

Many systems require multiple slave devices that are controlled by a single host device. In some cases, the slave devices are identical to each other and have a common first address. However, each slave device may need to operate independently from the other slave devices, so it may be desired to change the first address of each slave device to a new address that is unique from the addresses of the other slave devices. Conventional methods for changing the first address require additional pins and/or require independently powering the slave devices to change the first address, which increases the overall cost of each slave device and/or system.

SUMMARY OF THE INVENTION

Various embodiments of the present technology may provide methods and system for an integrated circuit. The system may provide, at most, two integrated circuits (i.e., slave devices) connected to and configured to communicate with a host device (i.e., a master device). At least one of integrated circuits may comprise a first interface and a second interface, wherein the second interface is connected to the host in a manner that is opposite that of the first interface.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, switching devices, current sources, voltage sources, logic gates, memory devices, semiconductor devices, such as transistors, capacitors, and the like, which may carry out a variety of functions. In addition, the present technology may be integrated in any number of electronic systems, such as automotive, aviation, "smart devices," portables, and consumer electronics, and the systems described are merely exemplary applications for the technology.

Figure 1:
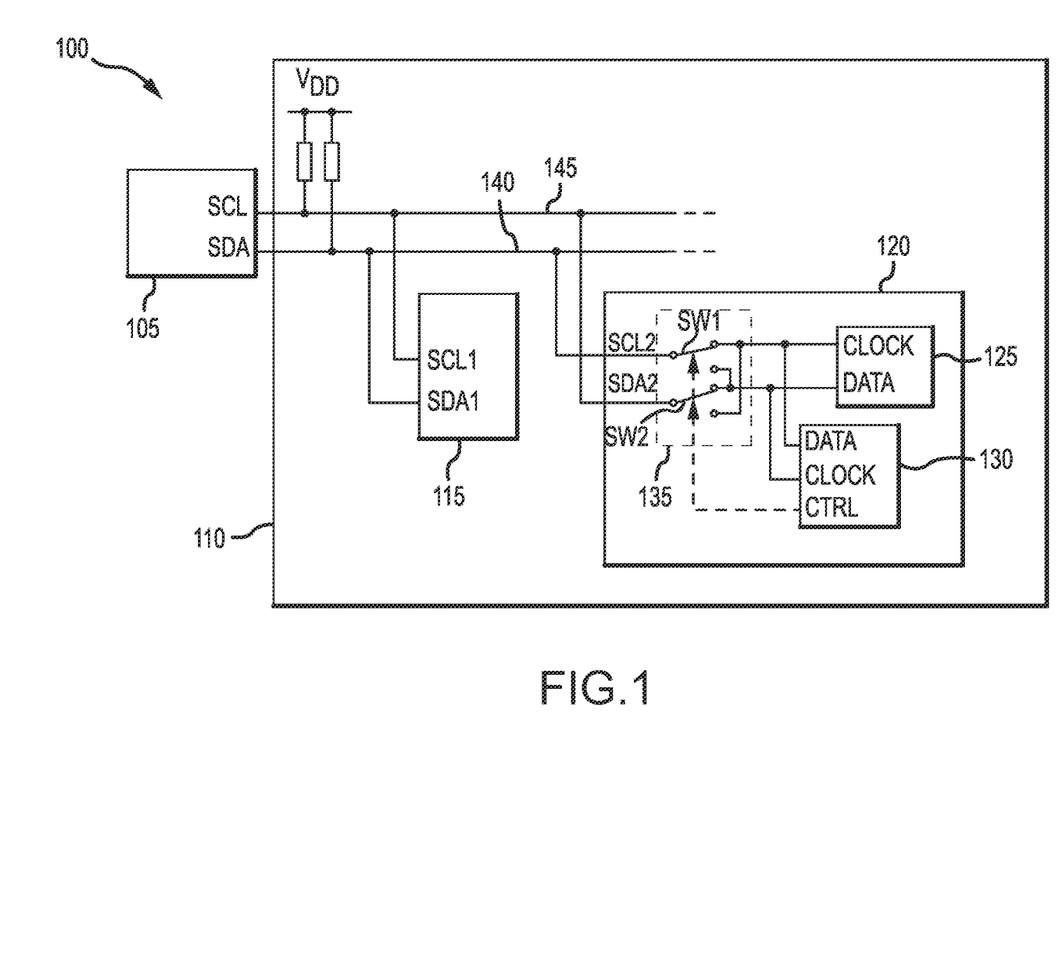
FIG. 1 is a block diagram of a system in accordance with an exemplary embodiment of the present technology.
Figure 2:
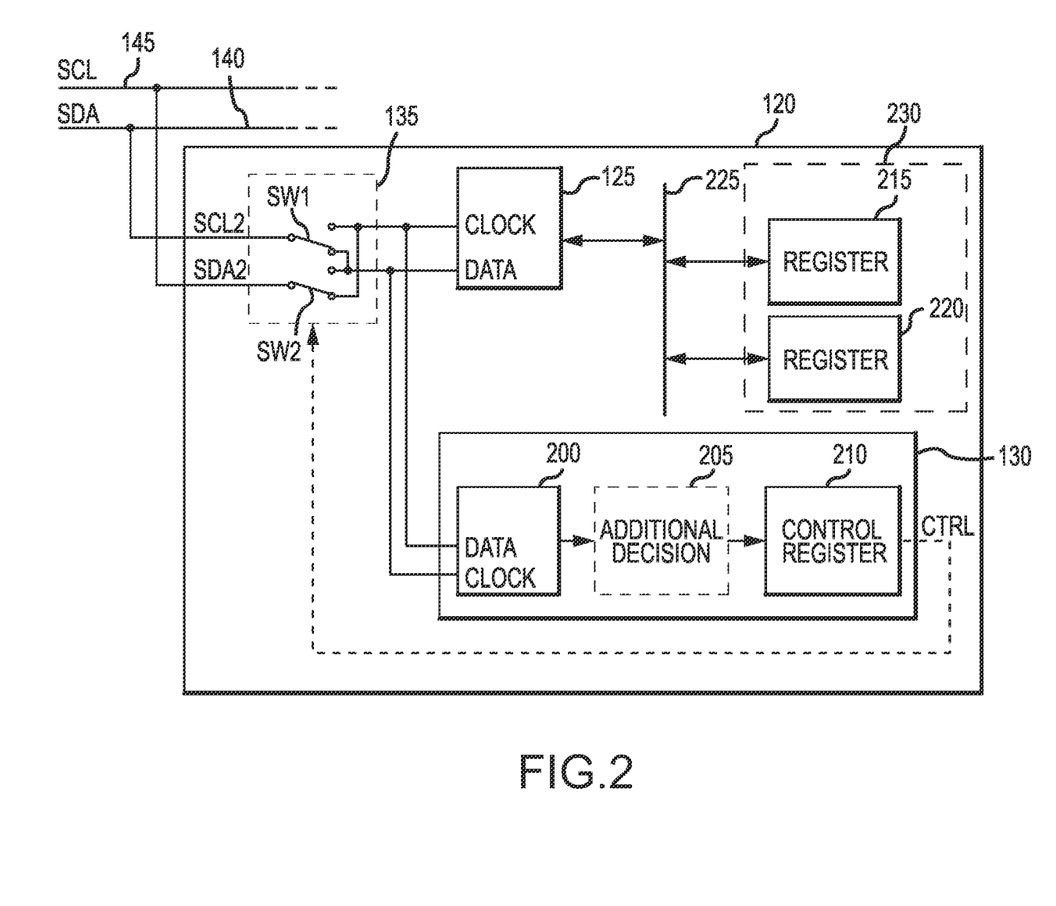
FIG. 2 is block diagram of an integrated circuit in accordance with an exemplary embodiment of the present technology.

Referring to FIGS. 1 and 2, an exemplary system 100 may be integrated in an electronic device (not shown), such as a camera, a cell phone, laptop computer, and the like, to provide communication and functionality between various components. For example, the system 100 may comprise a host device 105 (i.e., a master device), such as a microcontroller, and one or more integrated circuits (i.e., slave devices) formed on a printed circuit board (PCB) 110. In various embodiments, the PCB 110 may communicate with the host device 105 via a communication bus comprising a data line 140 and a clock line 145. In various embodiments, the data line 140 transmits data signals between the host device 105 and the PCB 110, and the clock line transmits a clock signal between the host device 105 and the PCB 110. According to an exemplary embodiment, the system 100 may be configured as an I$^2$C (Inter-integrated Circuit) comprising a serial computer bus. Accordingly, the data line 140 may be referred to as a serial data line and the clock line 150 may be referred to as a serial clock line.

The PCB 110 may be configured to receive and transmit various data and clock signals from and to the host device 105. For example, the data line 140 and the clock line 145 may connect the host device 105 and the PCB 110 to each other. The PCB 110 may comprise any number of sub-circuits and/or devices that may be used for any number of functions. According to an exemplary embodiment, the PCB 110 may comprise, at most, a first sub-circuit 115 (i.e., a first slave device) and a second sub-circuit 120 (i.e., a second slave device). Each of the first and second sub-circuits 115, 120 may be configured as a large-scale integrated circuit.

The first and second sub-circuits 115, 120 may be configured to communicate with the host device 105. For example, the first and second sub-circuits 115, 120 may be connected to both the data line 140 and the clock line 145. In one embodiment, the first and second sub-circuits 115, 120 may be substantially identical to each other. Alternatively, the first and second sub-circuits 115, 120 may be different from each other. In various embodiments, and during an initial state, each sub-circuit 115, 120 may have identical, first addresses (e.g., address XX). According to an exemplary embodiment, each sub-circuit 115, 120 may be configured as a driver circuit used to control an actuator (not shown).

Each of the first and second sub-circuits 115, 120 may comprise a clock terminal (SCL) and a data terminal (SDA). According to an exemplary embodiment, the first sub-circuit 115 may comprise a first clock terminal SCL1 and a first data terminal SDA1. The first clock terminal SCL1 may be connected to the clock line 145 and the first data terminal SDA1 may be connected to the data line 140.

The second sub-circuit 120 may comprise a second clock terminal SCL2 and a second data terminal SDA2. According to an exemplary embodiment, the second sub-circuit 120 may be connected in a manner that is opposite (reversed) that of the first sub-circuit 115. For example, the second clock terminal SCL2 may be connected to the data line 140 and the second data terminal SDA2 may be connected to the clock line 145 (referred to as a reverse connection). The second sub-circuit 120 may utilize the reverse connection to change the first address of the second sub-circuit to a new address that is different from the first address. In an exemplary embodiment, the second sub-circuit 120 may further comprise a first interface circuit 125, a switching circuit 135, a control circuit 130, and a memory 230.

The switching circuit 135 may be configured to selectively connect the second data terminal SDA2 to the first interface circuit 125 and the control circuit 130. The switching circuit 15 may also selectively connect the second clock terminal SCL2 to the first interface circuit 125 and the control circuit 130. For example, the switching circuit 135 may be directly connected to the second data terminal SDA2, the second clock terminal SCL2, the first interface circuit 125, and the control circuit 130.

In an exemplary embodiment, the switching circuit 135 may comprise a first switch SW1 and a second switch SW2. The first switch SW1 may be directly connected to the second clock terminal SCL2, and the second switch SW2 may be directly connected to the second data terminal SDA2. According to an exemplary embodiment, the switching circuit 135 is responsive to a control signal CTRL from the control circuit 130. For example, the first and second switches SW1, SW2 may operate according to a value of the control signal CTRL.

The first interface circuit 125 may be configured to communicate with the host device 105. In an exemplary embodiment, the first interface circuit 125 may comprise a clock terminal (CLOCK) and a data terminal (DATA). The clock terminal of the first integrated circuit 125 may be connected to one of the data line 140 and the clock line 145 via the switching circuit 135. Similarly, the data terminal of the first integrated circuit 125 may be connected to one of the data line 140 and the clock line 145 via the switching circuit 135. In addition, the first interface circuit 125 may be configured to communicate with the memory 230 via a secondary communication bus 225.

The memory 230 may be configured to store data, such as an address and other relevant information. The memory 230 may comprise any suitable type of memory, such as volatile and non-volatile memory devices. For example, the memory 230 may comprise any number of registers, such as a first register 215 and a second 220 that are configured to temporarily store data, such as the first address.

The control circuit 130 may comprise a second interface circuit 200 configured to communicate with the host device 105. In an exemplary embodiment, the second interface circuit 200 has a second address SS. The second interface circuit 200 may comprise a clock terminal (CLOCK) and a data terminal (DATA). The clock terminal of the second integrated circuit 200 may be connected to one of the data line 140 and the clock line 145 via the switching circuit 135. Similarly, the data terminal of the second integrated circuit 200 may be connected to one of the data line 140 and the clock line 145 via the switching circuit 135. In addition, the data terminal of the second interface circuit 200 may be connected to the clock terminal of the first interface circuit 125, and the clock terminal of the second interface circuit may be connected to the data terminal of the first interface circuit 125.

The control circuit 130 may further comprise a decision circuit 205 to realize more reliable operation of the switching circuit 135. For example, the decision circuit 205 may be connected to the second interface circuit 200 and perform one or more functions to confirm that the address sent by the host device 105 matches the second address SS of the second interface circuit 200 and generate an output signal accordingly. In one embodiment, the decision circuit 205 may be configured to recognize a special address linked to the second interface circuit 200. In another embodiment, the decision circuit 205 may be configured to generate a count value and compare the count value to a count threshold. The count value may be based on a number of times that the control circuit 130 receives or otherwise detects a reverse start condition and the second address. The decision circuit 205 may comprise any number of circuits and/or devices suitable for confirming information sent from the host device 105.

The control circuit 130 may further comprise a control register 210 configured to generate the control signal CTRL according to the output signal from the decision circuit 205. For example, the control signal CTRL may comprise a logic '1' (HIGH) and a logic '0' (LOW). The control circuit 130 may communicate or otherwise transmit the control signal CTRL to the switching circuit 135, wherein the first and second switches SW1, SW2 are responsive to the control signal CTRL.

In operation, the host device 105 is configured to recognize each sub-circuit 115, 120 and change the address from the first address XX to a new address (e.g., YY or ZZ) that is different from the first address XX. In some cases, the address change is only made to one sub-circuit. However, in other cases, it may be desirable to change the address of both sub-circuits to addresses that differ from each other and differ from the first address XX.

Referring to FIGS. 1-7, and according to various embodiments, during the initial state and after both sub-circuits 115, 120 are connected to the host device 105, both sub-circuits 115, 120 may share a common first address XX, and therefore, the host device 105 is unable to communicate with each sub-circuit individually. Accordingly, it may be desired to change the address of one or both sub-circuits from the first address XX to a new address (e.g., YY or ZZ). In addition, at the initial state (implementation), the first sub-circuit 115 is connected to the host device 105 with a forward pin connection (i.e., data terminal of the first sub-circuit 115 is connected to the data line 140 and the clock terminal of the first sub-circuit 115 is connected to the clock line 145), the second sub-circuit 120 is connected to the host device 105 with a reverse pin connection (i.e., data terminal of the second sub-circuit 120 is connected to the clock line 145 and clock terminal of the first interface circuit is connected to the data line 140). In addition, the first interface circuit 125 is connected to the host device 105 with the reverse pin connection (i.e., data terminal of the first interface circuit 125 is connected to the clock line 145 and clock terminal of the first interface circuit 125 is connected to the data line 140), and the second interface circuit 200 is connected to the host device 105 with a forward pin connection (i.e., the data terminal of the second interface circuit 200 is connected to the data line 140 and the clock terminal of the second interface circuit 200 is connected to the clock line 145).

During the initial state, the host device 105 is able to communicate with only the first sub-circuit 115 using the first address XX since it is connected with the forward pin connection. Neither the first interface circuit 125 nor the second interface circuit 200 of the second sub-circuit 120 recognize the first address since the first interface circuit 125 is connected with the reverse pin connection and the second interface circuit 200 is only able to acknowledge the second address SS. Accordingly, the host device 105 may change the address of the first sub-circuit 115 from the first address XX to a new address, such as address YY, without interfering with the addresses of the second sub-circuit 120.

Figure 3:
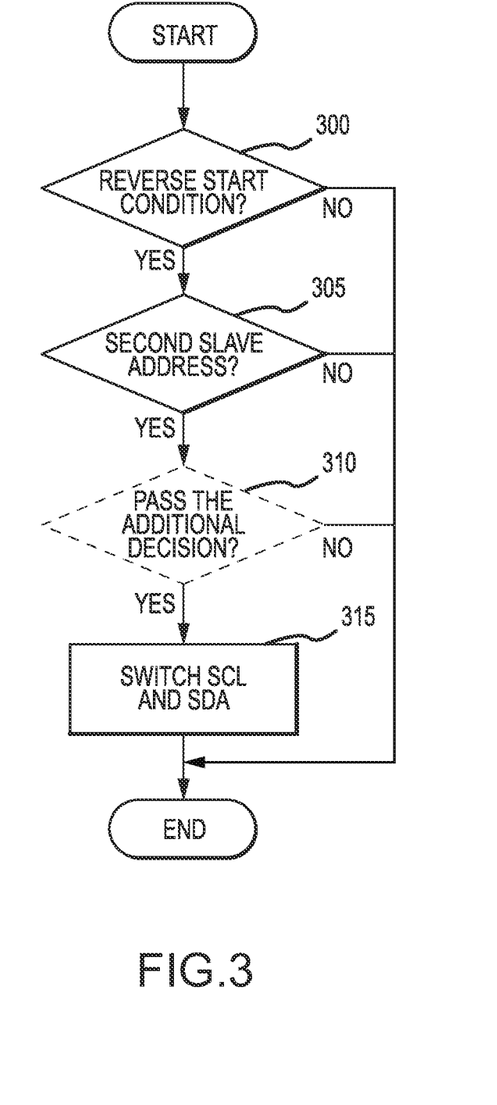
FIG. 3 is an operation flowchart of the integrated circuit in accordance with an exemplary embodiment of the present technology.
Figure 4:
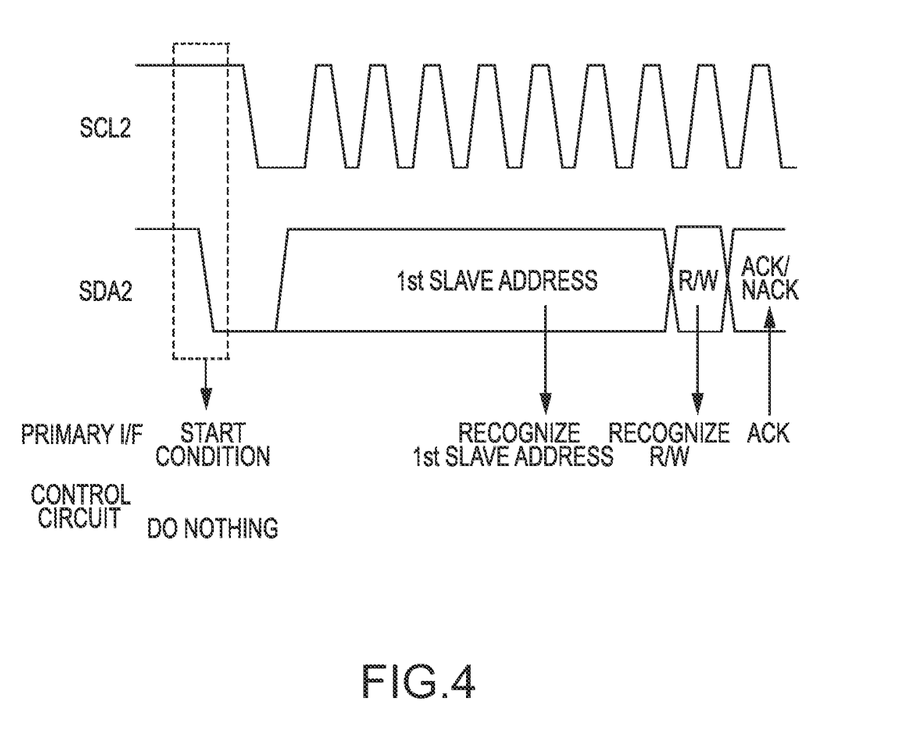
FIG. 4 is a timing diagram for the interface circuit in a first state in accordance with an exemplary embodiment of the present technology.
Figure 5:
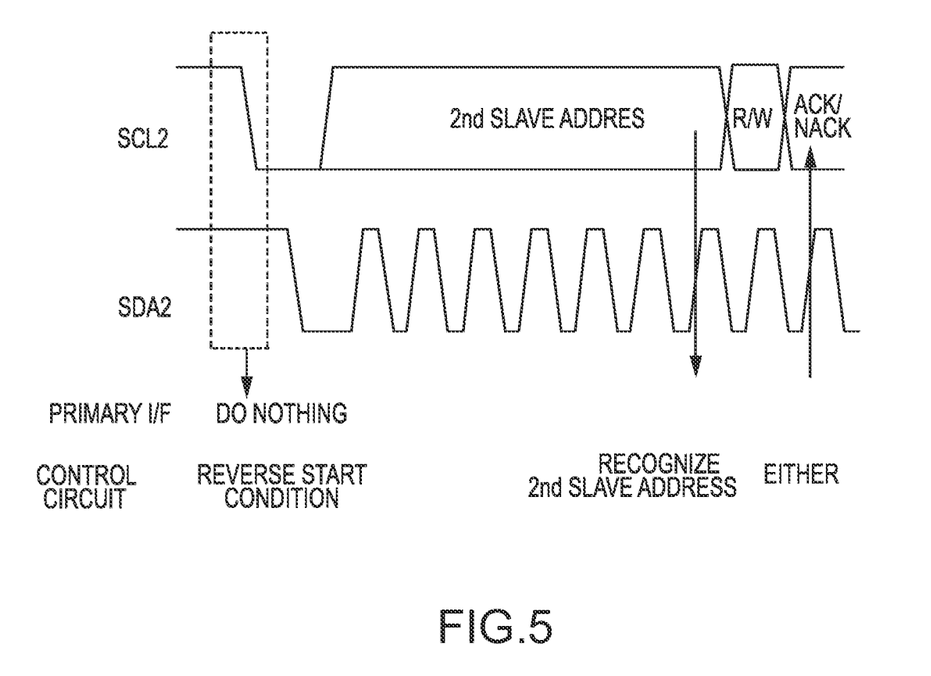
FIG. 5 is a timing diagram for the interface circuit in a second state in accordance with an exemplary embodiment of the present technology.
Figure 6:
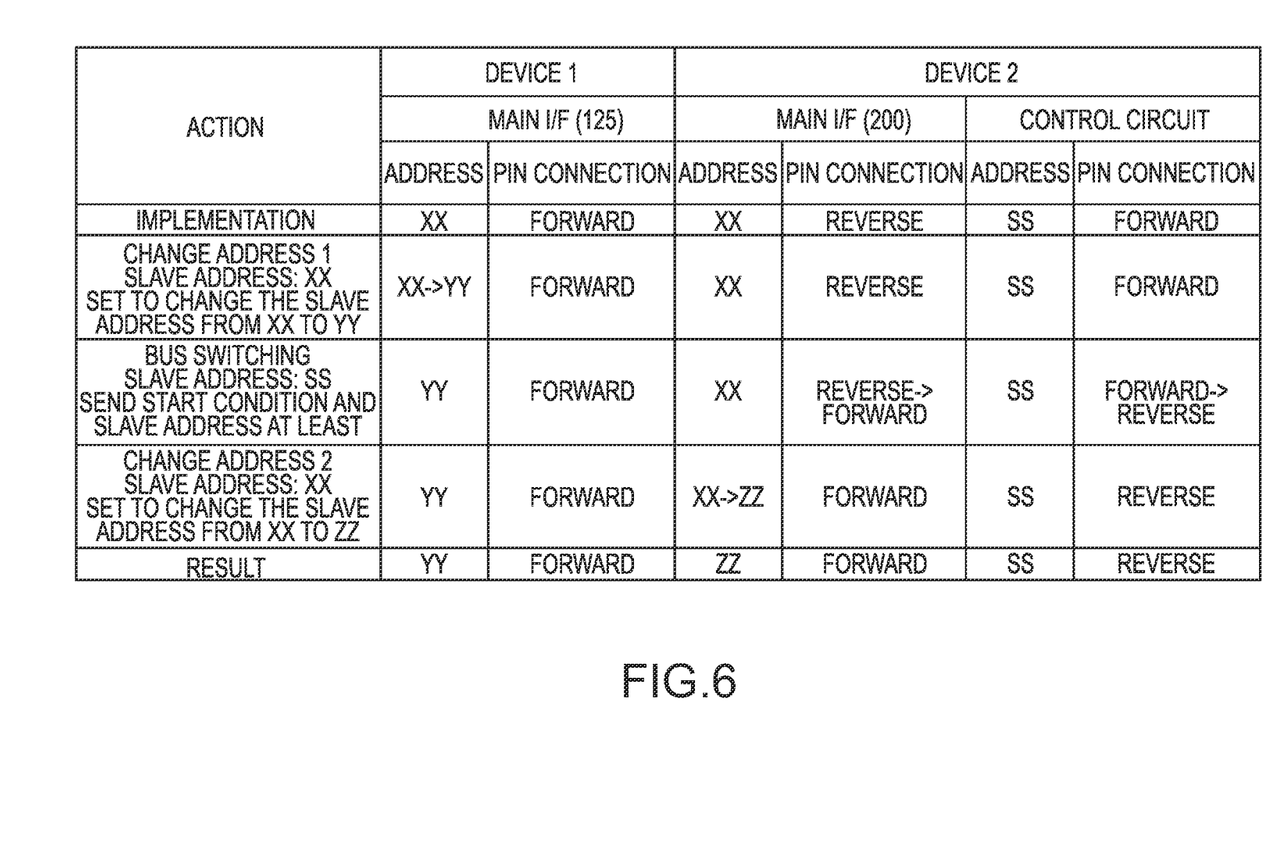
FIG. 6 is an operation chart of the system in accordance with a first embodiment of the present technology.
Figure 7:
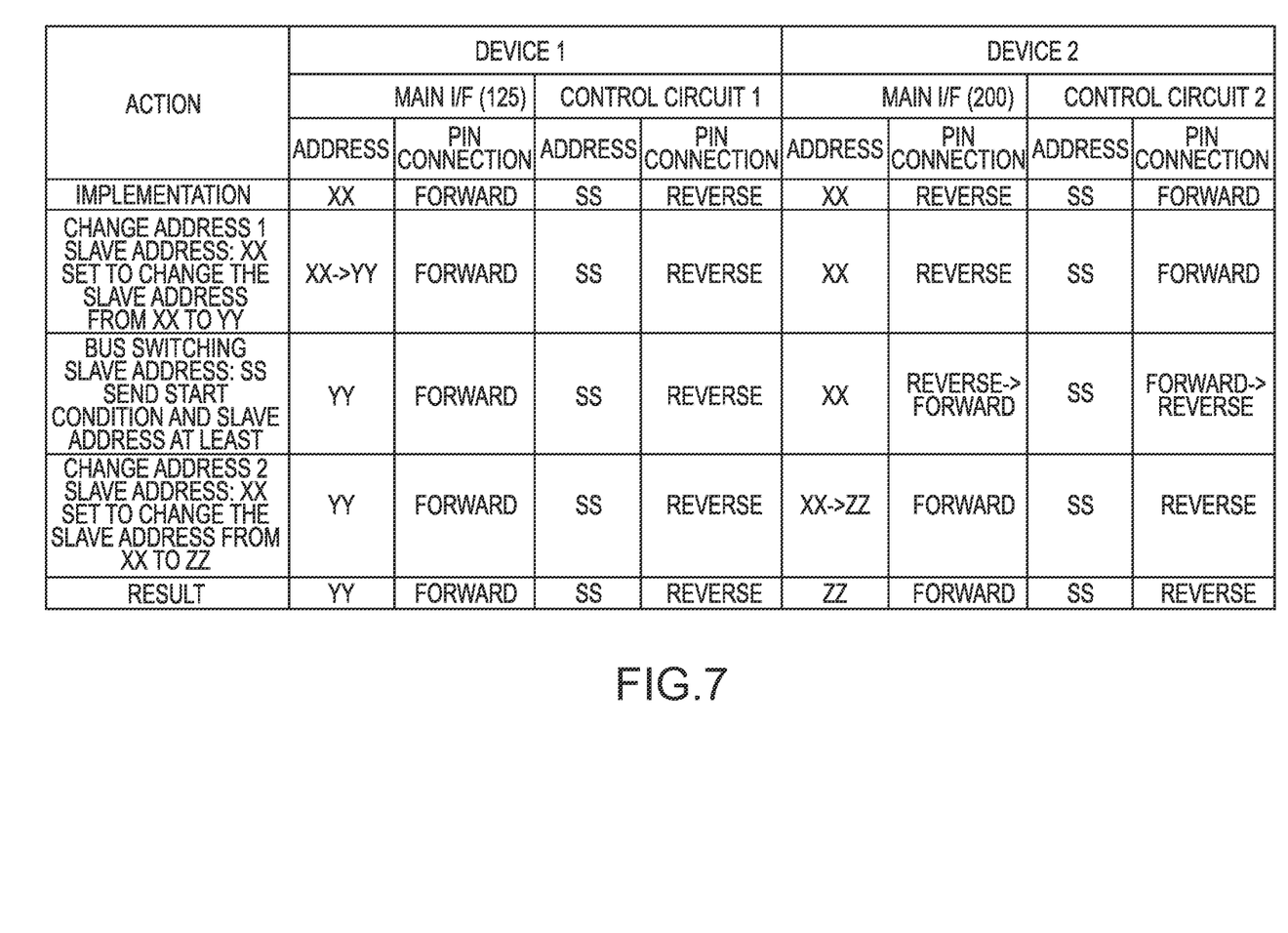
FIG. 7 is an operation chart of the system in accordance with a second embodiment of the present technology.

The second sub-circuit 120 and/or the control circuit 130 may then determine or otherwise detect a reverse start condition (300). For example, and referring to FIG. 5, the control circuit 130 may detect a change in the signal on at the clock terminal SCL2. In an exemplary embodiment, the control circuit 130 detects when the signal on the clock terminal SCL2 changes from a HIGH signal to a LOW signal. During the reverse start condition, the first and second switches SW1, SW2 and/or the terminals (i.e., pins) of the first interface circuit 125 may be in a first position (such as illustrated in FIG. 1). For example, the first switch SW1 is connecting the second clock terminal SCL2 (and the data line 140) to the data terminal of the first interface circuit 125 and the data terminal of the second interface circuit 200, and the second switch SW2 is connecting the second data terminal SDA2 (and the clock line 145) to the data terminal of the first interface circuit 125 and the clock terminal of the second interface circuit 200. If the reverse start condition is not detected, then the process ends.

If the reverse start condition is detected, then the control circuit 130 may determine if the second interface circuit 200 receives the second address SS (305) (in addition to the first address) from the host device 105, wherein the second address SS is different from the first address XX. If the second address SS is not detected, then the process ends. If the second address SS is detected, then the control circuit 130 may perform one or more additional recognitions/detections of the second address SS (310). If the second address SS is still not detected, then the process ends.

If the second address SS is detected, then the first and second switches SW1, SW2 are switched to a second position (315) (such as illustrated in FIG. 2). The second position may be opposite from the first position. For example, the second position may be defined as the first switch SW1 connecting the second clock terminal SCL2 (and the data line 140) to the data terminal of the first interface circuit 125 and the clock terminal of the second interface circuit 200, and the second switch SW2 is connecting the second data terminal SDA2 (and the clock line 145) to the clock terminal of the first interface circuit 125 and the data terminal of the second interface circuit 200.

In the second position, the first interface circuit 125 is now connected to the data and clock lines 140, 145 with the forward pin connection, and the second interface circuit 200 is connected to the data and clock lines 140, 145 with the reverse pin connection. According to the present pin connections, the host device 105 may communicate with the first interface circuit 125 and change the address of the first interface circuit 125 from the first address XX to a new address, such as address ZZ. For example, and referring to FIG. 4, the first interface circuit 125 may detect a start condition. The start condition may be defined as a change in the signal at the data terminal SDA2. In an exemplary embodiment, the first interface circuit 125 detects when the signal on the data terminal SDA2 changes from a HIGH signal to a LOW signal. Accordingly, at the end of the process, the first sub-circuit 115 has address YY and is connected to the host device 105 with the forward pin connection, and the second sub-circuit 120 comprises the first integrated circuit 125 having address ZZ and connected to the host device 105 with the forward pin connection and the second integrated circuit 200 having the second address SS and connected to the host device 105 with the reverse pin connection.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An integrated circuit capable of connecting to a host device via a first communication line and a second communication line, comprising:
    a first pair of terminals configured to connect to the first communication line and the second communication line;

a first interface circuit comprising:
  a second clock terminal; and
  a second data terminal;
a switching circuit connected between the first pair of terminals and the first interface circuit, wherein the switching circuit is configured to:
  selectively connect a first terminal, from the first pair of terminals, to the second clock terminal via a third communication line and to the second data terminal via a fourth communication line; and
  selectively connect a second terminal, from the first pair of terminals, to the second clock terminal via the third communication line and to the second data terminal via the fourth communication line; and
a control circuit comprising:
  a third clock terminal connected to the third communication line; and
  a third data input terminal connected to the fourth communication line;
  wherein the control circuit generates an output signal according to a signal on each of the third and fourth communication lines, and wherein the switching circuit is responsive to the output signal.

2. The integrated circuit according to claim 1, wherein the control circuit comprises a second interface circuit and a register.

3. The integrated circuit according to claim 1, wherein the switching circuit comprises:
  a first switch adapted to selectively connect a first terminal, from the first pair of terminals, to one of the second clock terminal and the second data terminal; and
  a second switch adapted to selectively connect a second terminal, from the first pair of terminals, to one of the second clock terminal and the second data terminal.

4. The integrated circuit according to claim 1, wherein the control circuit is configured to generate the output signal according to a clock signal and a data signal.

5. The integrated circuit according to claim 1, wherein the first pair of terminals comprises:
  a first data terminal configured to receive a clock signal; and
  a first clock terminal configured to receive a data signal.

6. The integrated circuit according to claim 1, wherein the first interface circuit has a first address and the control circuit has a second address that is different from the first address.

7. A method for changing an address of a first slave device and a second slave device, wherein each slave device is connected to a same host, comprising:
  receiving a first communication signal from the host at a first pair of terminals of the first slave device and a second pair of terminals of the second slave device via a common communication bus; wherein:
    at an initial condition, the first and second slave devices have a same first address; and
    the first communication signal comprises the first address;
  the second slave device comprises:
    a first interface circuit having a first address; and
    a second interface circuit having a second address;
  recognizing, with the first slave device, the first address;
  acknowledging, with the first slave device, the first communication signal;
  assigning a new address to the first slave device comprising overwriting the first address with the new address; and
  preventing the second slave device from recognizing the first communication signal, comprising:
    connecting the first interface circuit to the host in a reverse manner;
    connecting the second interface circuit to the host device in a forward manner.

8. The method according to claim 7, further comprising: bus switching comprising:
  connecting the first interface circuit to the host device in the forward manner; and
  connecting the second interface circuit to the host device in the reverse manner.

9. The method according to claim 8, further comprising:
  receiving a second communication signal from the host device at the pairs of terminals of the first and second slave devices via the common communication bus, wherein the second communication signal comprises the first address; and
  recognizing, with the second slave device, the first address.

10. The method according to claim 7, wherein, at a first instance, the first slave device and the first interface circuit have the same first addresses and the second interface circuit has the second address.

11. The method according to claim 7, wherein, at a second instance, the first slave device has the new address, the second interface circuit has the second address, and the first interface circuit device has the first address.

12. A system, comprising:
  a host device comprising:
    a first pair of terminals comprising:
      a first clock terminal; and
      a first data terminal; and
  an integrated circuit connected to the host device and comprising:
    at most, a first slave device and a second slave device; wherein:
      the first slave device comprises:
        a second pair of terminals comprising:
          a second clock terminal connected to the first clock terminal via a first communication bus; and
          a second data terminal connected to the first data terminal via a second communication bus; and
      the second slave device comprises:
        a third pair of terminals comprising:
          a third clock terminal connected to the first data terminal via the second communication bus;
          a third data terminal connected to the first clock terminal via the first communication bus;
        a first interface circuit comprising a fourth pair of terminals;
        a switching circuit connected between the third pair of terminals and the first interface circuit, wherein the switching circuit is configured to selectively connect each terminal, from the third pair of terminals, to the fourth pair of terminals; and
        a control circuit connected to the switching circuit and the first interface circuit.

13. The system according to claim 12, wherein the fourth pair of terminals comprises:
  a fourth clock terminal; and
  a fourth data terminal.

14. The system according to claim 12, wherein the control circuit comprises a fifth pair of terminals comprising:
  a fifth clock terminal connected to the fourth data terminal; and
  a fifth data terminal connected to the fifth clock terminal.

15. The system according to claim 12, wherein the control circuit is configured to generate an output signal according to a clock signal and a data signal.

16. The system according to claim 15, wherein the first and second switches are responsive to the output signal.

17. The system according to claim 12, wherein the control circuit comprises a second interface circuit and a register.

18. The system according to claim 12, wherein the switching circuit comprises:
- a first switch configured to selectively connect the third clock terminal to one of the fourth clock terminal and the fourth data terminal; and
- a second switch configured to selectively connect the third data terminal to one of the fourth clock terminal and the fourth data terminal.

19. The system according to claim 12, wherein, at an initial condition, the first slave device and the first interface circuit have a same first address and the control circuit has a second address that is different from the first address.

* * * * *